United States Patent

Huber et al.

[11] Patent Number: 5,493,397
[45] Date of Patent: Feb. 20, 1996

[54] MULTI-COORDINATE MEASURING SYSTEM USING A CROSS GRATING TO CREATE A PLURALITY OF DIFFRACTION BEAMS EMANATING FROM TWO OR MORE COORDINATE DIRECTIONS

[75] Inventors: Walter Huber, Traunstein; Michael Aligüer, Stein/Traun, both of Germany

[73] Assignee: Dr. Johannes Heidenhain GmbH, Traunreut, Germany

[21] Appl. No.: 188,186

[22] Filed: Jan. 27, 1994

[30] Foreign Application Priority Data

Jan. 28, 1993 [DE] Germany .......................... 43 02 313.4

[51] Int. Cl.$^6$ ............................ G01B 11/00; G01B 11/02
[52] U.S. Cl. ..................... 356/356; 356/363; 250/237 G
[58] Field of Search ...................... 356/356, 363; 250/237 G

[56] References Cited

U.S. PATENT DOCUMENTS

| | | | |
|---|---|---|---|
| 3,756,723 | 9/1973 | Hock | 356/354 |
| 3,822,942 | 7/1974 | Hock | 356/351 |
| 3,891,321 | 6/1975 | Hock | 356/356 |
| 3,996,463 | 12/1976 | Jablonowski | 356/398 |
| 4,779,001 | 10/1988 | Makosch | 356/401 |
| 4,895,447 | 1/1990 | Järisch et al. | 356/356 |
| 4,923,300 | 5/1990 | Michel et al. | 356/356 |
| 4,938,595 | 7/1990 | Parrieaux et al. | 356/356 |
| 4,955,718 | 9/1990 | Michel | 356/356 |
| 5,001,340 | 3/1991 | Schwefel et al. | 250/237 G |
| 5,113,066 | 5/1992 | Michel et al. | 250/237 G |
| 5,127,733 | 7/1992 | Allgäuer | 356/356 |
| 5,264,915 | 11/1993 | Huber et al. | 356/356 |
| 5,271,078 | 12/1993 | Franz et al. | 385/14 |

FOREIGN PATENT DOCUMENTS

| | | |
|---|---|---|
| 4007968 | 9/1991 | Germany . |
| 4105434 | 8/1992 | Germany . |
| 60-24414 | 6/1985 | Japan . |

OTHER PUBLICATIONS

Hock, Fromund, "Photoelektrische Messung der Anderung von Langen oder Winkelpositionen mit Hilfe von Beugugsgittern", Section 11.6, pp. 192–194, published Oct. 29, 1975.

Primary Examiner—Frank Gonzalez
Assistant Examiner—Jason D. Eisenberg
Attorney, Agent, or Firm—Willian Brinks Hofer Gilson & Lione

[57] ABSTRACT

A multi-coordinate measuring system having a diffraction element that receives light emitted by a light source and diffracts the light into at least a first, second, third and fourth partial beam bundles where the first, second, third and fourth partial beam bundles are directed in different coordinate directions onto a substrate. The substrate has first, second, third and fourth waveguides located thereon. The substrate has a coupling element that directs the first, second, third and fourth partial beam bundles into the first, second, third and fourth waveguides, respectively. The substrate also has a first coupling element for bringing the first and second partial beam bundles into interference and a second coupling element for bringing the third and fourth partial beam bundles into interference. A detector system then detects the interference of the first and second partial beam bundles and the third and fourth partial beam bundles.

19 Claims, 4 Drawing Sheets

5,493,397

MULTI-COORDINATE MEASURING SYSTEM USING A CROSS GRATING TO CREATE A PLURALITY OF DIFFRACTION BEAMS EMANATING FROM TWO OR MORE COORDINATE DIRECTIONS

FIELD OF THE INVENTION

The invention relates to a multi-coordinate measuring system operating optically by diffraction with at least one grating as the measuring representation which generates a plurality of partial bundles of beams diffracted into different coordinate directions from light coming from a light source and a scanning unit having a plurality of detectors assigned to the diffracted partial bundle of beams.

BACKGROUND OF THE INVENTION

An interferential measuring system for measuring in two directions is described by Fromund Hock of Stuttgart, Germany, in Section 11.6 of his 1978 dissertation entitled "Photoelektrische Messung der Änderung yon Längen oder Winkelpositionen mir Hilfe yon Beugungsgittern" [Photo-Electrical Measurement of the Changes in Lengths and Angular Position with the Aid of Diffraction Gratings]. A collimated light beam emitted by a light source penetrates a grating of a scale extending diagonally to the two directions of measurement as well as four locality frequency filter screens and is imaged by means of two lenses on a first linear grating which is aligned in the first measuring direction and combines the diffracted bundle of light beams which had been diffracted into this first measuring direction at the scale. The combined diffracted bundles of beams of the first measuring direction are guided by means of a third lens to first detectors which provide scanning signals for the generation of measuring values for the first measuring direction. The diffracted bundles of beams which had been diffracted into the second measuring direction at the scale are imaged by means of a fourth lens on a second linear grating which is aligned in the second measuring direction and then reach second detectors providing scanning signals for the generation of measuring values for the second measuring direction. A disadvantage associated with such a measuring system is its elaborate and complex construction.

SUMMARY OF THE INVENTION

According to an aspect of the present invention there is provided an interferential multi-coordinate measuring system having a grating for diffracting light emitted by a light source into at least a first, second, third and fourth partial beam bundles. The first, second, third and fourth partial beam bundles are directed in different coordinate directions and impinge upon a substrate having a coupling element; a first, second, third and fourth waveguides; a first and second couplers and a first and second detectors. The first, second, third and fourth partial beam bundles are coupled into the first, second, third and fourth waveguides respectively by the coupling element. The first and second partial beam bundles are brought into interference in the first coupler and the third and fourth partial beam bundles are brought into interference in the second coupler. The interference in the first and second couplers is detected and converted to electrical signals by the first and second detectors.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

DETAILED DESCRIPTION OF THE PRESENTLY PREFERRED EMBODIMENTS

Figure 1:
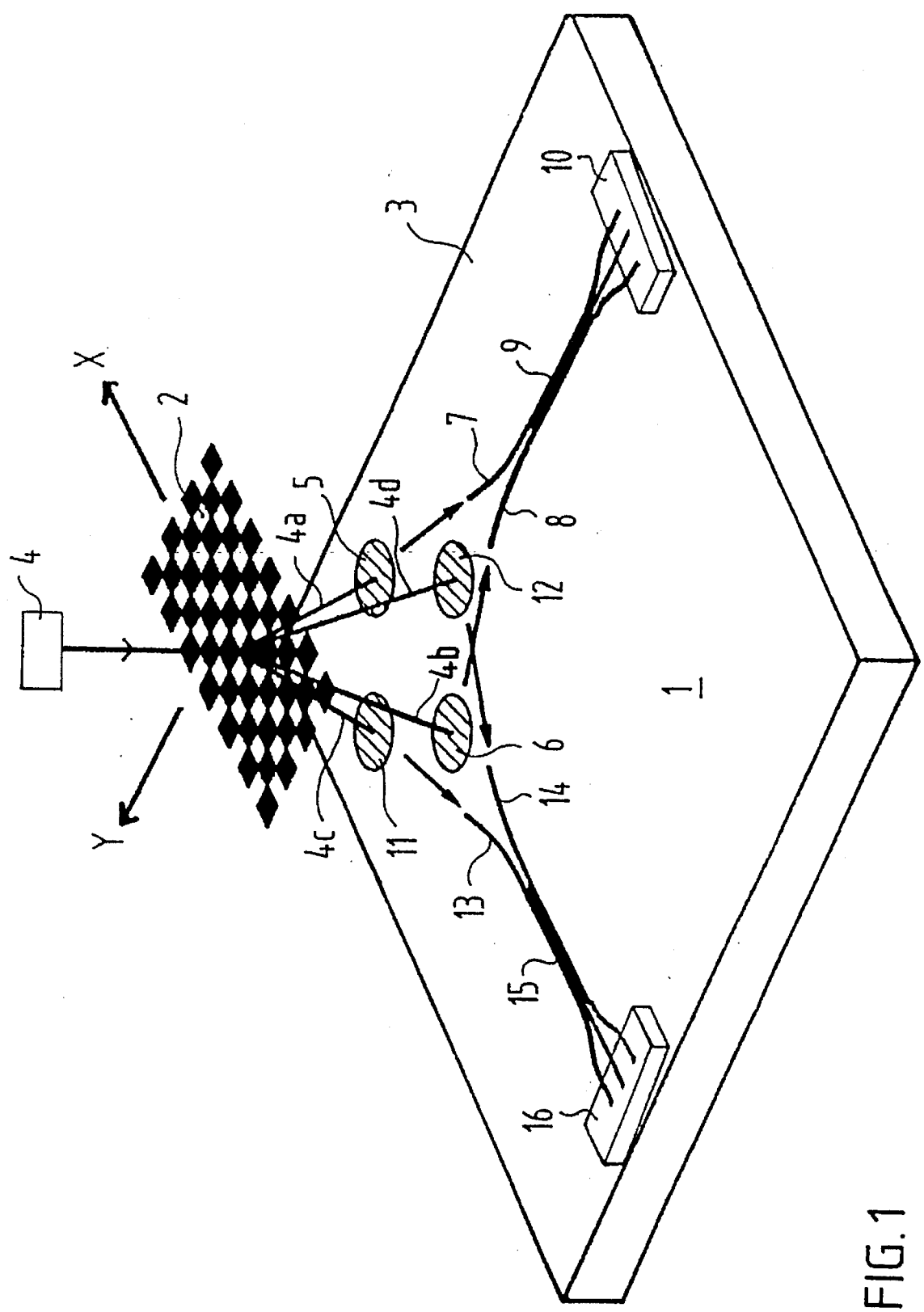
FIG. 1 is a schematic view of a multi-coordinate interferential measuring system for measuring in two directions according to a first embodiment of the present invention.

FIG. 1 is a schematic of a multi-coordinate interferential measuring system 1 for measuring in two directions according to a first embodiment of the present invention. The measuring system 1 includes a light source 4, cross grating 2 and substrate 3. Located on the substrate 3 are coupling grids 5, 6, 11 and 12; waveguides 7, 8, 13 and 14; couplers 9 and 15 and detectors 10 and 16. In a preferred embodiment, the substrate 3 and light source 4 form a scanning unit and are mounted on a reading head (not shown) that is displaceable relative to the cross grating 2 which is the measuring representation. The multi-coordinate measuring system 1 illustrated in FIG. 1 operates by utilizing transmitted light and measures the movements of the measuring representation in the form of the cross grating 2 with respect to the substrate 3 in the orthogonal directions labelled by arrows X and Y. Cross grating 2 preferably is embodied as a phase structure. In a preferred embodiment, light source 4 is a laser, waveguides 7, 8, 13 and 14 are formed as strip waveguides and couplers 9 and 15 are so-called 2×3 couplers. Light coming from light source 4 is diffracted at the cross grating 2 and a plurality of partial bundles of beams is created, of which the partial bundles of beams 4a, 4b, 4c and 4d are employed for measuring in two coordinate directions X and Y.

The partial bundle of beams 4a is generated by diffraction at the cross grating 2 in the positive X-direction into the +1 order. Also the partial bundle of beams 4b is generated by diffraction at the cross grating 2 in the negative X-direction into the −1 order. The partial bundles of beams 4a and 4b fall on the coupling grids 5 and 6, which feed the partial bundle of beams 4a and 4b to strip waveguides 7 and 8. The two strip waveguides 7 and 8 terminate in a so-called 2×3 coupler 9. The partial bundles of beams 4a and 4b fed-in to the coupler 9 are brought into interference and are subsequently supplied to an associated detector 10. The detector 10 converts the optical signals into electrical signals which represent the measured value along the X-coordinate.

The determination of the measuring value Y along the Y-coordinate is accomplished in a similar manner by coupling partial bundles of beams 4c and 4d through coupling grids 11 and 12 to strip waveguides 13 and 14. The partial beams 4c and 4d are fed-in to coupler 15 where they are brought into interference and are subsequently supplied to detector 15. The detector 15 converts the optical signals into electrical signals which represent the measured value along the Y-coordinate.

Figure 2:
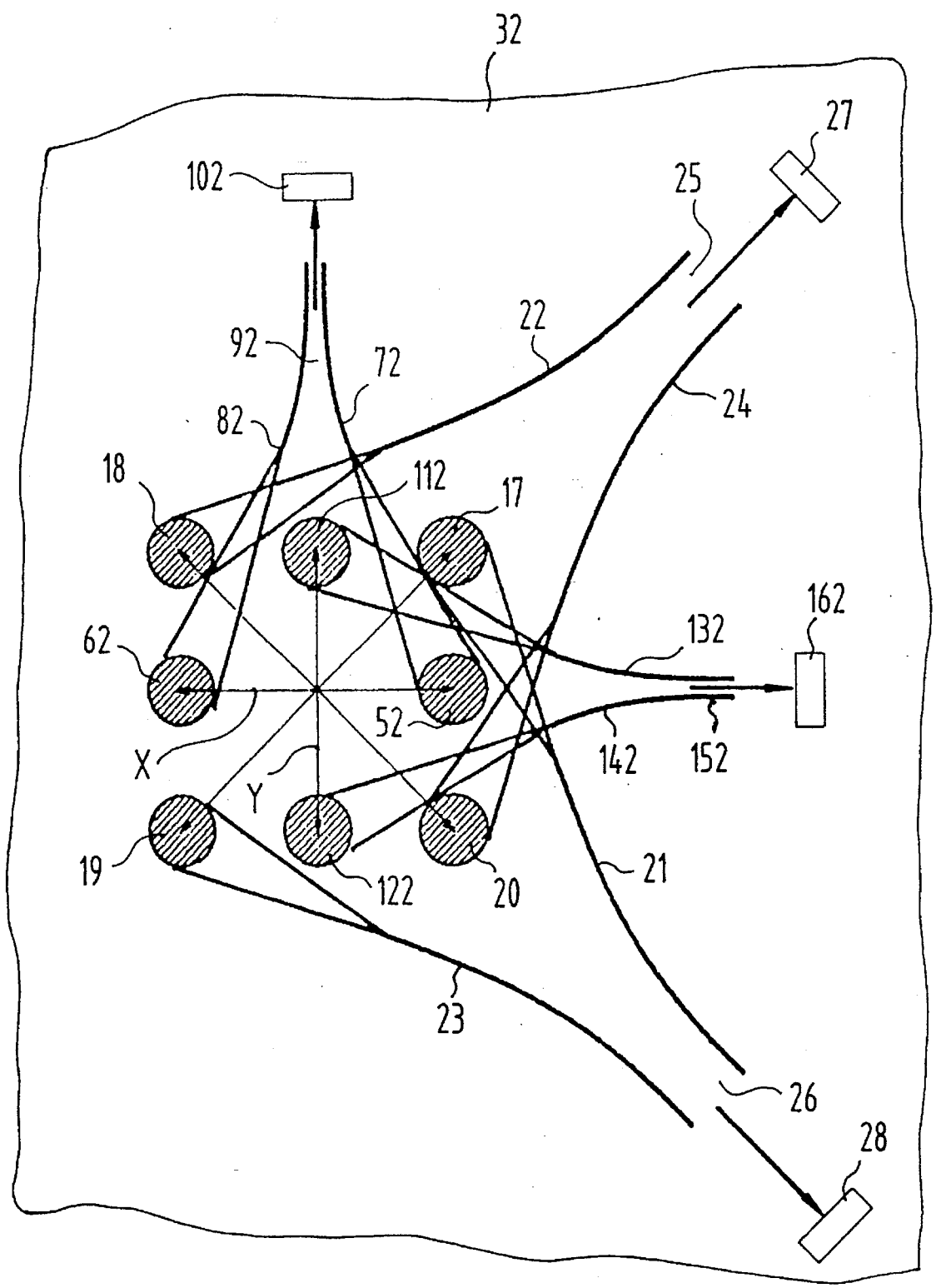
FIG. 2 is a top view of a substrate according to a second embodiment of the present invention.

FIG. 2 is a top view of a substrate 32 according to a second embodiment of the present invention. Substrate 32 may replace substrate 3 of FIG. 1 to provide redundancy if redundancy is desired in the measuring system as will be described hereinafter.

Figure 3:
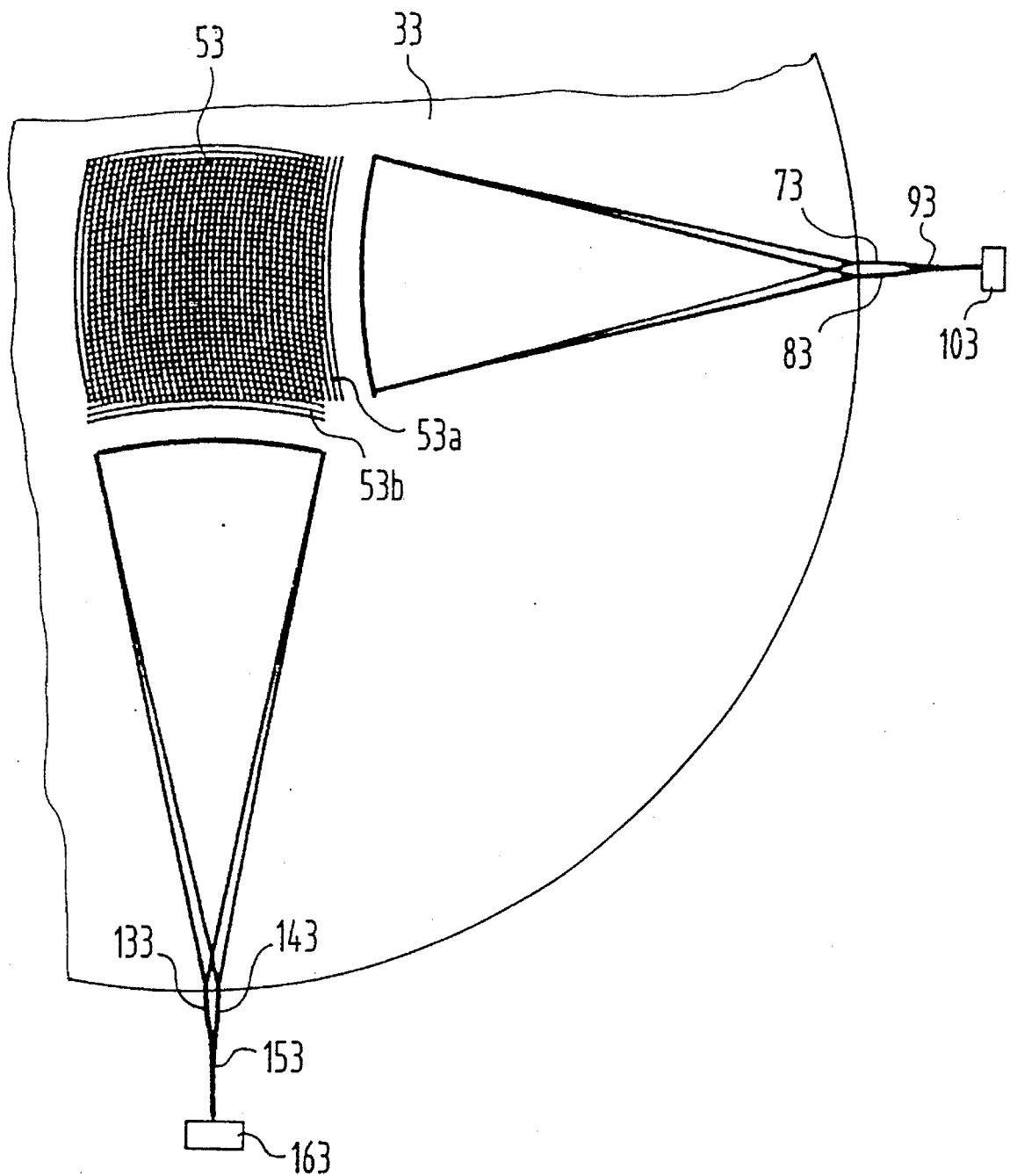
FIG. 3 is a top view of a substrate according to a third embodiment of the present invention.

Equivalent functional elements in FIGS. 2 and 3 have reference numerals corresponding to FIG. 1 but with an index increased by the number of the drawing figure. Additional elements are consecutively numbered.

With reference to FIG. 2, a first and a second measuring system are provided. The first measuring system includes coupling grids 52, 62, 112 and 122 and the associated strip wave guides 72, 82, 132 and 142 which correspond to the coupling grids and strip waveguides previously described with reference to FIG. 1. The second measuring system includes additional coupling grids 17, 18, 19 and 20 to which strip waveguides 21, 22, 23 and 24 are assigned. Strip waveguides 21, 22, 23 and 24 terminate in additional couplers 25 and 26 which supply the interfering partial bundles of beams to detectors 27 and 28. These coupling grids 17, 18, 19 and 20 utilize additional diffracted partial bundles of beams so that a complete second cross grating multi-coordinate measuring system is formed, which is turned by 45° in the coordinate system with respect to the first multi-coordinate measuring system.

By including the additional coupling grids 17, 18, 19 and 20; strip waveguides 21, 22, 23 and 24; couplers 25 and 26 and detectors 27 and 28, a redundant multi-coordinate measuring system is created wherein the second measuring system turned by 45° can take over the complete measuring function if the first measuring system fails.

FIG. 3 is a top view of a substrate according to a third embodiment of the present invention. A substrate, not further identified, is preferably embodied as a planar waveguide 33. A single coupling grid 53, preferably consisting of two grids crossing each other, is provided in lieu of the plurality of single coupling grids previously described with reference to FIGS. 1 and 2. A particularly advantageous constellation results if the coupling grid 53 is formed by two crossed circular grids 53a and 53b.

In a manner similar to that of the previously described embodiments shown in FIGS. 1 and 2, four of the generated partial bundles of beams (not shown) are coupled by this special coupling grid 53 into the planar waveguide 33 and supplied to four strip waveguides 73, 83, 133 and 143. The partial bundles of beams are brought to interference in couplers 93 and 153 and converted into electrical measuring signals by detectors 103 and 163.

Figure 4:
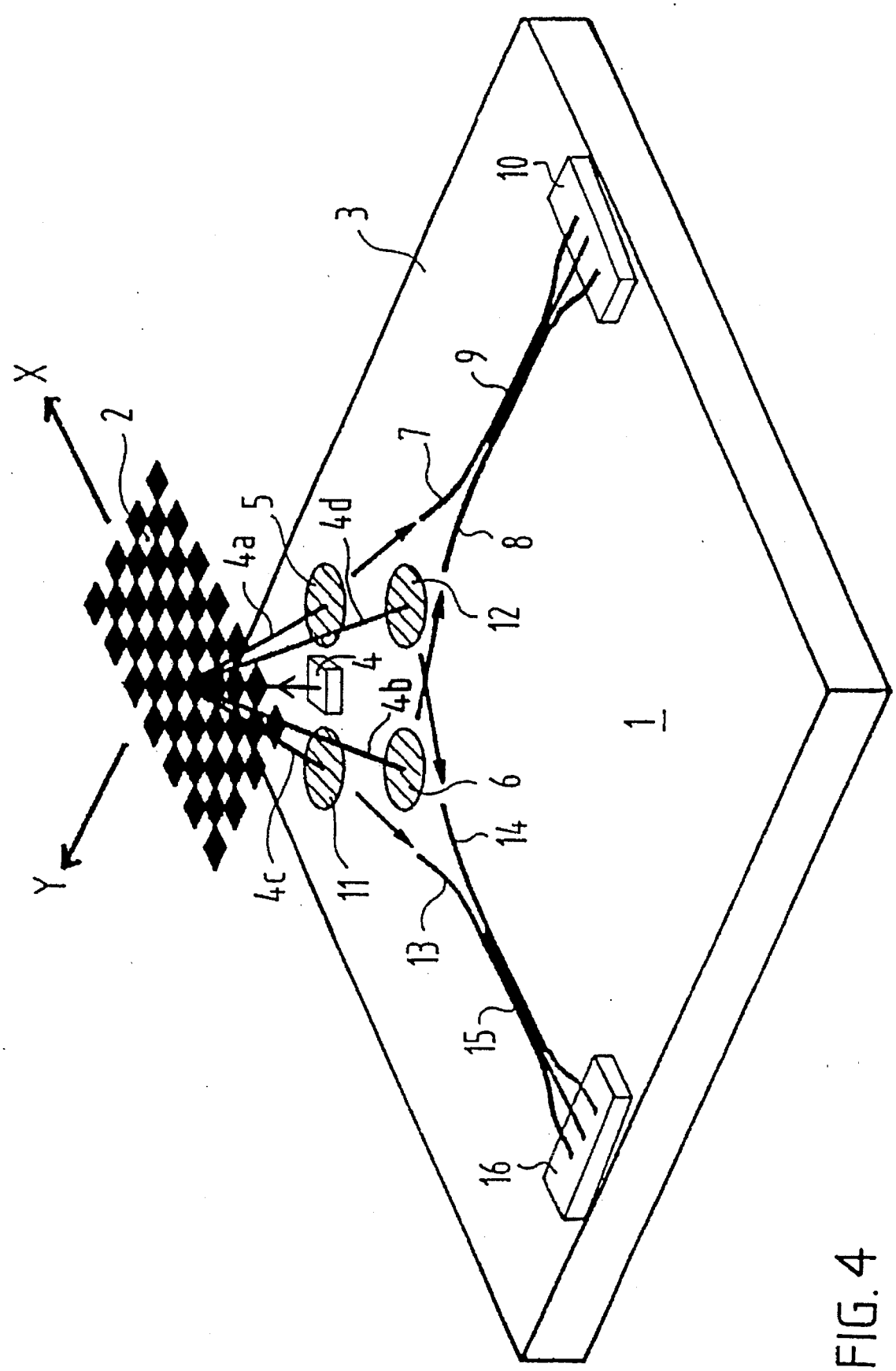
FIG. 4 is a schematic view of a multi-coordinate interferential measuring system for measuring in two directions according to a fourth embodiment of the present invention.

Alternatively, a multi-coordinate measuring system utilizing incident light can be provided by including a light source integrated into the substrate and an appropriate cross grating as schematically shown in FIG. 4.

An advantage of the interferential multi-coordinate measuring systems shown in FIGS. 1–3 is the high degree of measuring accuracy achieved along with an essentially simpler construction.

Another advantage of the present invention allows a simpler construction through the use of a cross grating in connection with all of the advantages of integrated optics such as freedom from harmonics and defined phase interrelations between the signals and the coupler outlet.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A multi-coordinate measuring system comprising:
    a grating for diffracting light emitted by a light source into at least a first, second, third and fourth partial beam bundles; the first, second, third and fourth partial beam bundles being directed in different coordinate directions;
    a substrate;
    a first strip waveguide located on the substrate;
    a second strip waveguide located on the substrate;
    a third strip waveguide located on the substrate;
    a fourth strip waveguide located on the substrate;
    a coupling element located on the substrate,
    the coupling element coupling the first, second, third and fourth strip partial beam bundles into the first, second, third and fourth waveguides respectively, wherein the coupling element is formed by at least two curved grids;
    a first coupler located on the substrate and communicating with the first and the second strip waveguides for bringing the first and the second partial beam bundles into interference;
    a second coupler located on the substrate and communicating with the third and fourth strip waveguides for bringing the third and fourth partial beam bundles into interference;
    a first detector communicating with the first coupler; and
    a second detector communicating with the second coupler.

2. A multi-coordinate measuring system according to claim 1 wherein the two curved grids of the coupling element cross each other.

3. A multi-coordinate measuring system according to claim 2 wherein the two curved grids are circular grids.

4. A multi-coordinate measuring system according to claim 1 wherein the first, second, third and fourth waveguides are strip waveguides.

5. A multi-coordinate measuring system according to claim 1 wherein the first and second couplers are 2×3 couplers.

6. A multi-coordinate measuring system according to claim 1 wherein the first and second partial beam bundles are diffracted in a direction orthogonal to the third and fourth partial beam bundles.

7. A multi-coordinate measuring system according to claim 1 further including:
    a fifth waveguide located on the substrate;
    a sixth waveguide located on the substrate;
    a seventh waveguide located on the substrate;
    an eighth waveguide located on the substrate;
    wherein the grating additionally generates a fifth, sixth, seventh and eighth partial beam bundles and the coupling element couples the fifth, sixth, seventh and eighth partial beam bundles into the fifth, sixth, seventh and eighth waveguides respectively;
    a third coupler located on the substrate and communicating with the fifth and sixth waveguides for bringing the fifth and sixth partial beam bundles into interference;
    a fourth coupler located on the substrate and communicating with the seventh and eighth waveguides for bringing the seventh and eighth partial beam bundles into interference;

a third detector communicating with the third coupler; and a fourth detector communicating with the fourth coupler.

8. A multi-coordinate measuring system according to claim 7 wherein the fifth and sixth partial beam bundles are diffracted in a direction orthogonal to the seventh and eight partial beam bundles.

9. A multi-coordinate measuring system according to claim 1 wherein the light source is a laser.

10. A multi-coordinate measuring system according to claim 1 wherein the light emitted by the light source is transmitted through the grating.

11. A multi-coordinate measuring system according to claim 1 wherein the grating is a cross grating.

12. A multi-coordinate measuring system according to claim 11 wherein the cross grating has a phase structure.

13. A multi-coordinate measuring system according to claim 1 wherein the light emitted by the light source is reflected by the grating.

14. A multi-coordinate measuring system according to claim 1 wherein the light source is located on the substrate.

15. A method for measuring along multi-coordinates comprising the steps of:

diffracting light emitted by a light source into at least a first, second, third and fourth partial beam bundles; the first, second, third and fourth partial beam bundles being directed in different coordinate directions;

coupling the first, second, third and fourth partial beam bundles into first, second, third and fourth strip waveguides using a coupling element formed by two curved grids, said coupling element communicating with said first, second, third and fourth waveguides located on a substrate;

bringing the first and second partial beam bundles into interference;

bringing the third and fourth partial beam bundles into interference; and detecting the interference of the first and second partial beam bundles and the third and fourth partial beam bundles.

16. A method according to claim 15 wherein the two curved grids of the coupling element cross one another.

17. A multi-coordinate measuring system comprising:

a diffraction element that receives light emitted by a light source and diffracts said light into at least a first, second, third and fourth partial beam bundles; the first, second, third and fourth partial beam bundles being directed in different coordinate directions;

a substrate;

a first strip waveguide located on the substrate;

a second strip waveguide located on the substrate;

a third strip waveguide located on the substrate;

a fourth strip waveguide located on the substrate;

a coupling element located on the substrate that directs the first, second, third and fourth partial beam bundles into the first, second, third and fourth strip waveguides respectively, said coupling element formed by at least two curved grids;

a first coupler communicating with said first and second strip waveguides and brings the first and second partial beam bundles into interference;

a second coupler communicating with said first and second strip waveguides brings the third and fourth partial beam bundles into interference; and a detector system that detects the interference of the first and second partial beam bundles and the third and fourth partial beam bundles.

18. A multi-coordinate measuring system according to claim 17 wherein the said diffraction element comprises a grating.

19. A multi-coordinate measuring system according to claim 17 wherein the two curved grids cross one another.

* * * * *

UNITED STATES PATENT AND TRADEMARK OFFICE
CERTIFICATE OF CORRECTION

PATENT NO. : 5,493,397
DATED : February 20, 1996
INVENTOR(S) : Walter Huber et al.

It is certified that error appears in the above-indentified patent and that said Letters Patent is hereby corrected as shown below:

<u>On the Title Page</u>: item [75] Inventor,

In column 1, line 7, delete "Aligüer" and substitute --Allgäuer--.

Column 5,
    In claim 8, line 3, delete "eight" and substitute --eighth--.

Signed and Sealed this

Second Day of July, 1996

*Attest:*

BRUCE LEHMAN

*Attesting Officer*     *Commissioner of Patents and Trademarks*